United States Patent Office 3,262,829
Patented July 26, 1966

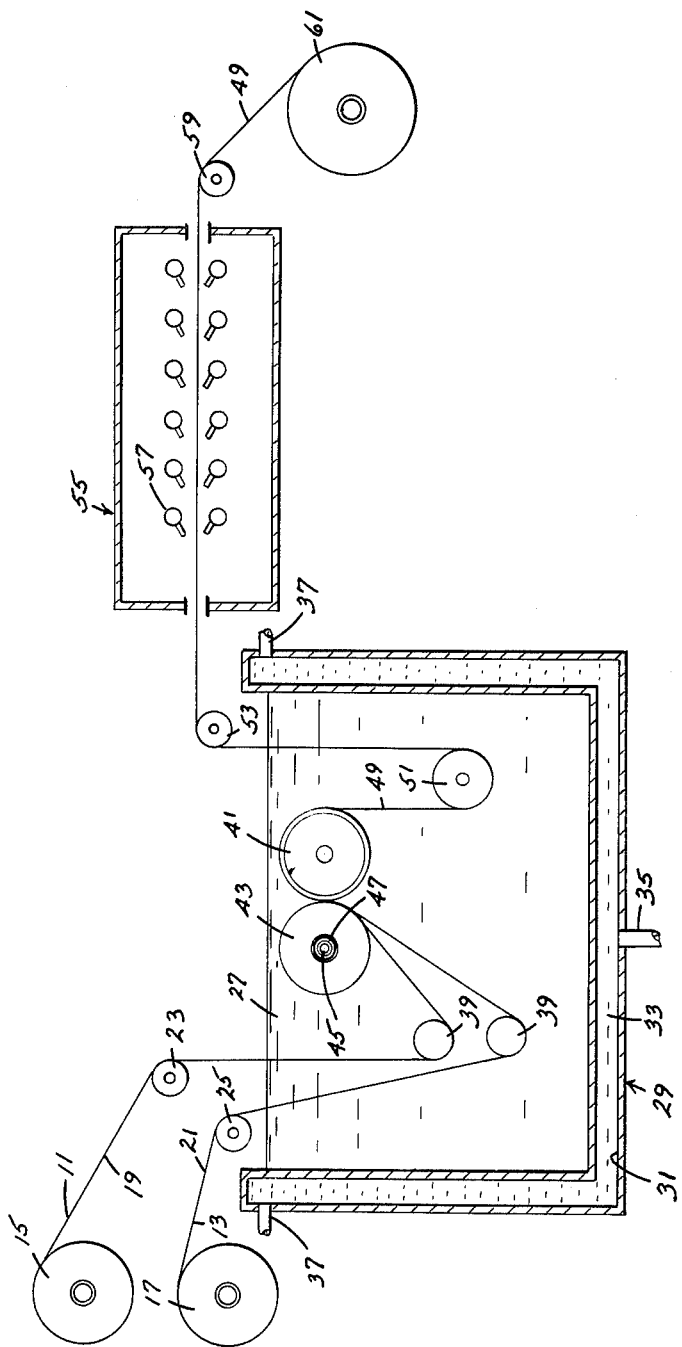

3,262,829
METHOD OF LAMINATING FILMS
John D. Conti, Elkins Park, Pa., assignor, by mesne assignments, to FMC Corporation, San Jose, Calif., a corporation of Delaware
Filed Apr. 26, 1963, Ser. No. 275,992
11 Claims. (Cl. 156—307)

This invention relates to the production of composite articles, and more particularly to an improved method for laminating water-insoluble hyrophilic sheet materials.

In accordance with conventional procedures, hydrophilic sheet materials which are to be laminated are coated on at least one of the opposing sides thereof with a thermoplastic material and then combined, generally, by being passed between pressure rollers. The sheet materials may be coated, for example, by known solvent coating or melt extrusion procedures, and may be combined before or after the applied thermoplastic material has set. In the latter instance the pressure rollers are heated to again render the applied coating tacky as the sheet materials are pressed therebetween.

A significant disadvantage of these known procedures is that the heat applied to the hydrophilic sheet materials during the coating and/or laminating operations causes considerable moisture to escape from the sheet materials. Humidification of the resulting laminated product may, of course, render it suitable for its intended uses. However, such humidifying operations are generally slow and costly and are often unsatisfactory especially when appreciable quantities of moisture must be restored into the product. Accordingly, a primary object of this invention is to provide a generally new or improved and more satisfactory method for laminating hydrophilic sheet materials.

Another object of the invention is to provide an improved method for laminating hydrophilic sheet materials under heat and pressure while preventing the loss of moisture therefrom.

Still another object of the invention is the provision of an improved method in which hydrophilic sheet materials are laminated to each other under heat and pressure while being humidified.

A further object is to provide an improved high speed and continuous method for concomitantly humidifying and laminating films formed from hydrophilic materials.

A still further object is the provision of an improved method in which traces of solvent are removed from freshly coated films during the humidification thereof.

Still further objects will appear from the following description.

These objects are accomplished in accordance with the present invention by a method wherein two or more water-insoluble hydrophilic sheet materials or films are laminated to each other, under heat and pressure, while being immersed within a water bath. The sheet materials to be laminated in accordance with the method of the present invention are provided with a continuous coating of thermoplastic material on at least one side of each pair of opposing sides. Preferably, only the surface portions of such coatings are softened during the laminating stage of the method to thereby assure a good bond and, when transparent sheet materials are being combined, to preserve the clarity thereof.

The sheet materials are initially immersed within the heated water bath in spaced apart relationship so that humidification can occur along all surfaces thereof. The temperature of the water bath can be varied as desired but is preferably maintained at approximately its boiling point to facilitate rapid penetration thereof into the sheet materials.

When applicable, the heated water bath may serve also to soften the coatings of thermoplastic material carried by the sheet materials. In this instance, the sheet materials are preferably engaged with each other when only the surfaces of their coatings have been softened and immediately prior to or concomitantly with the application of pressure. Under these conditions, flow or other distortion of the coatings of thermoplastic material and/or the entrapment of water between the sheet materials is minimized or avoided.

Heat may be and preferably is applied to the sheet materials during the pressing or laminating stage of the method. More specifically, as the sheet materials are being pressed together they are rapidly heated to a temperature within or even slightly above the softening range of the thermoplastic material forming the coatings thereon and are maintained at such temperature for only a short period. Such applied heat may, by itself, serve to soften the coatings of thermoplastic material or may assist the heated water bath in achieving and/or maintaining such condition. Of particular importance is that the surrounding water bath rapidly removes and dissipates the heat which is applied during the pressing stage and thus prevents excessive fusion of the coatings and/or possible scorching of the sheet materials. Optionally, the sheet may be preheated before being immersed within the water bath to thereby minimize the amount of heat which must be supplied by the bath itself.

Upon being withdrawn from the heated water bath, the resulting composite product is passed through a known humidifying apparatus in which free surface moisture is removed and the moisture content of the composite product is adjusted to a desired level.

Apparatus which is suitable for effecting lamination of the sheet materials, as described above, includes a conventional steel temperature roller and a cooperating rubber-covered pressure roller. The surface of the steel roller is kept at a desired temperature by electrical heaters and/or a suitable heated fluid which is circulated within the interior thereof.

Laminating of the sheet materials while they are immersed within a water bath not only prevents the escape of moisture from the sheet materials as they are being heated and pressed but also permits the sheet materials to assume large quantities of moisture prior to and after the actual laminating operation. Further, when solvent coated sheet materials are laminated in accordance with the method of the present invention, it has been found that all residual traces of solvent are removed so that the resulting composite product is well adapted for use with food products and exhibits good performance on automatic packaging and heat sealing equipment.

The laminating method of the present invention is not limited to any particular water-insoluble hydrophilic sheet materials or to sheet materials having coatings of only certain thermoplastic materials which are applied to the sides thereof. One or both of the opposing sides of the sheet materials which are to be laminated may be provided with a coating of thermoplastic material and, if desired, the individual sheet materials may be each coated on their opposite sides with the same or different thermoplastic materials. The hydrophilic sheet materials to be laminated may be in the form of individual sheets or continuous films, webs, bands, ribbons, and the like.

For the sake of clarity and simplicity, the method of the present invention is hereafter described as applied to laminating a pair of continuous, transparent regenerated cellulose films formed from viscose, which is commonly known as cellophane, and which are provided with a vinyl coating on at least each of the opposing sides thereof. More specifically, the thermoplastic coating material is selected from the group consisting of polyolefins having molecular weights of from 10,000 to 100,000 and densities in g./cc. of from 0.88 to 0.97 and interpolymers containing 50 to 95% by weight of vinylidene chloride, as more fully described in U.S. Patent No. 3,037,868. The thermoplastic material may be applied onto the individual regenerated cellulose films by melt extrusion procedures, which is preferred in the case of polyolefin coatings, or from a lacquer or emulsion, as is preferred when vinylidene chloride interpolymers are employed. In view of the rapid and extensive humidification effected during the method of the present invention, humidification of the individual regenerated cellulose films by conventional procedures to restore moisture lost during the coating operation is neither necessary nor desired.

The single figure of the drawing diagrammatically illustrates an apparatus which is suitable for use in the method of the present invention.

Referring now to the drawing, transparent regenerated cellulose films to be laminated, indicated at 11 and 13, are together drawn from supply rolls 15 and 17 with their coated sides 19 and 21 disposed in opposing relationship, passed about separate guide rolls 23 and 25, and then immersed within a heated water bath 27. A tank 29 contains the water bath 27 and is of double wall construction to provide a cavity 31 through which a hot fluid 33 is circulated, as by inlet pipe 35 and discharge pipes 37. The circulating hot fluid 33 serves to maintain the water bath 27 at a desired elevated temperature without rendering the same turbulent. If desired, additional heat may be supplied to the bath 27 by suitable steam coils located within the tank itself. With regenerated cellulose films coated with the particular vinyl materials heretofore mentioned, the bath 27 may be and preferably is heated up to about 100° C.

Within the water bath 27, the films 11 and 13 are laced about independent guide rolls 39 to change their directions of travel and are then brought together, for the first time, as they are passed in-between a rubber covered pressure roller 41 and a temperature roller 43. During this short travel through the water bath 27, the films 11 and 13 can assume comparatively large quantities of moisture since the water bath is at a high temperature and is in contact with all surfaces of the two films.

The high temperature of the water bath 27 serves also to at least initially soften the coated sides 19 and 21 of the respective films 11 and 13 and thus prepares them for bonding with each other as they move in-between the pressure and temperature rollers. For best results, the films 11 and 13 are preferably first brought together after only the surfaces of their coated sides 19 and 21 are softened and immediately prior to or concomitantly with the application of pressure thereto. Premature overlapping of the films 11 and 13 removes the opposing coated sides 19 and 21 out of direct contact with the heated water bath and thus reduces the rate at which the films are heated and humidified. Further, contacting the films well in advance of the pressing stage may cause water to be trapped between the films. Such entrapped water may insulate the coated sides 19 and 21 from the heat of the bath 27 as well as the heat applied during the pressing stage so that portions of the films may remain unbonded. Additionally, entrapped masses of water are difficult to remove during the pressing stage and may distort the films and/or the softened coated sides thereof. On the other hand, delaying the overlapping and pressing of the films may in some instances cause excessive fusion and/or flow along the coated sides of the films.

The temperature roller 43 is of steel construction and is preferably maintained heated to within or even slightly above the softening temperature range of the thermoplastic coating material, as by a hot liquid which is circulated through the interior thereof by conduits 45 and 47. As more fully described in U.S. Patent No. 3,037,868, noted above, coatings formed of polyethylenes having a molecular weight in the approximate range of 10,000 to 20,000 and a density in the range of about 0.91 to 0.95 g./cc. will soften within the temperature range of from about 100° C. to 110° C. Polypropylenes, on the other hand, having molecular weights of between about 30,000 and 50,000 and a density in the range of about 0.88 to 0.90 g./cc. will soften at a temperature within the range of from 100° C. to 125° C.

The pressure and temperature rollers 41 and 43 are of known construction and include means for together rotating the same and means for causing the roller 41 to urge the overlapped films against the roller 43 under a desired pressure, neither of which means is illustrated on the accompanying drawing. Thus, as the overlapped films 11 and 13 travel in-between the cooperating pressure and temperature rollers 41 and 43, any moisture remaining between the films is squeezed therefrom, the surface portions of their coated sides are maintained or rendered tacky and the films are pressed together concomitantly with the heating thereof to provide a laminated or composite product 49.

As illustrated, the resulting composite product 49 may be caused to travel along an extended path with the water bath, as by being laced about a guide roll 51, to permit still further humidification of the films thereof.

Once removed from the water bath 27 the laminated product 49 is led over a guide roll 53 and into a humidifying apparatus 55, which is of a construction as disclosed, for example, in U.S. Patent No. 2,718,065. Within the humidifying apparatus, the composite product 49 is subjected to a gaseous atmosphere, such as steam, which is preferably discharged against the product at high velocity through nozzles 57 to thereby remove free surface water and to adjust the moisture content of the product to a desired level. With transparent regenerated cellulose films, as employed in the detailed description of the present invention, the composite product 49 leaving the apparatus 55 preferably has a moisture content of at least 6.0 to 7.5%, and may range as high as 11%. The now fully humidified composite product 49 is led over a guide roll 59 as it issues from the humidifying apparatus 55 and is collected in roll form, as shown at 61.

It is to be understood that changes and variations may be made without departing from the spirit and scope of the invention as defined in the appended claims.

I claim:

1. A method of making a composite product including the steps of immersing a plurality of substantially dry individual hydrophilic sheet materials within a heated water bath in separated relationship to humidify the same and to soften a substantially dry coating of thermoplastic material carried on at least certain of the sides thereof, disposing the sheet materials in overlapping relationship with at least one side of each pair of opposing sides having a softened coating of thermoplastic material, bonding the overlapped sheet materials together under pressure while they are still immersed within the heated water bath and the coatings thereon are in a softened condition to provide a composite product, and removing the resulting composite product from the water bath.

2. A method of making a composite product from a plurality of substantially dry individual hydrophilic sheet materials having a substantially dry coating of thermoplastic material on at least certain of the sides thereof including the steps of immersing the sheet materials within a water bath heated to a temperature not greater than the softening temperature range of the thermoplastic material forming the coatings thereon, maintaining the sheet materials immersed and positioning the same in overlapping relationship with at least one side of each pair of opposing sides thereof having a coating of thermoplastic material, heating the overlapped sheet materials further to within the softening temperature range of the thermoplastic material forming said coatings while pressing the overlapped sheet materials together to provide a composite product, and removing the resulting composite product from the water bath.

3. A method as defined in claim 2 wherein the water bath is heated to a temperature less than the softening temperature range of the thermoplastic material forming said coatings.

4. A method as defined in claim 2 wherein the water bath is heated to a temperature within the softening temperature range of the thermoplastic material forming said coatings and the overlapped sheet materials are heated to a temperature slightly greater than that of the water bath during the pressing thereof.

5. A method of laminating a plurality of continuous films formed of substantially dry hydrophilic materials and having a substantially dry coating of thermoplastic material on at least one side of each pair of opposing sides including the steps of continuously advancing the plurality of films into a heated water bath, heating portions of the advancing films which are within the water bath further to a temperature within the softening temperature range of the thermoplastic material forming said coatings, pressing the opposing sides of such film portions together as the coating thereon become softened to thereby laminate the same, and cooling the laminated films.

6. A method as defined in claim 5 wherein the water bath is heated to a temperature within the softening temperature range of the thermoplastic material forming said coatings, and further including the step of maintaining the films in spaced apart relationship as they are advanced into the water bath.

7. A method as defined in claim 6 wherein the films are heated to a temperature slightly greater than that of the water bath during the pressing thereof.

8. A method as defined in claim 5 further including the step of removing the laminated films from the water bath and subjecting the exposed sides thereof to a moist steam atmosphere to adjust the humidity of the same.

9. A method as defined in claim 5 further including the step of preheating the advancing continuous films to a temperature not greater than the temperature of the water bath prior to immersing the same therein.

10. A method of laminating a plurality of substantially dry, continuous non-fibrous, hydrophilic cellulosic films having a substantially dry coating of thermoplastic material on at least one side of each pair of opposing sides which includes the steps of advancing the plurality of films into a water bath heated to a temperature of not greater than 100° C., rapidly heating portions of the films which are immersed within the water bath further to a temperature at least within the softening range of the thermoplastic material forming the coatings thereon, pressing the opposing sides of such film portions together while the coatings thereon are in a softened condition to thereby laminate the same, and continuously removing the laminated portions of the films from the heated water bath and subjecting the same to an atmosphere of moist steam to adjust the moisture content thereof.

11. A method as defined in claim 10 wherein the films are formed of regenerated cellulose and wherein the coatings comprise a material selected from the group consisting of polyolefins having molecular weight of from 10,000 to 100,000 and densities in g./cc. of from 0.88 to 0.97 and interpolymers containing 50 to 95% by weight of vinylidene chloride.

References Cited by the Examiner

UNITED STATES PATENTS

| 2,264,494 | 12/1941 | Wickwire | 156—152 |
| 2,640,799 | 6/1953 | Grangaard | 156—324 |
| 2,975,093 | 3/1961 | Park | 161—249 X |
| 3,037,868 | 6/1962 | Rosser | 161—249 X |
| 3,099,350 | 7/1963 | Hammond | 161—249 X |

FOREIGN PATENTS

| 734,079 | 7/1955 | Great Britain. |

EARL M. BERGERT, *Primary Examiner.*

C. B. COSBY, *Assistant Examiner.*